United States Patent [19]

McWhorter

[11] 4,312,313

[45] Jan. 26, 1982

[54] ENGINE VERTICAL VENTILLATION

[76] Inventor: Edward M. McWhorter, 6931 Greenbrook Cir., Citrus Heights, Calif. 95610

[21] Appl. No.: 156,573

[22] Filed: Jun. 5, 1980

Related U.S. Application Data

[63] Continuation-in-part of Ser. No. 956,666, Nov. 1, 1978, abandoned, and a continuation-in-part of Ser. No. 102,910, Dec. 12, 1979, Pat. No. 4,248,199.

[51] Int. Cl.³ .................... F02B 15/00; F02B 75/02; F02M 25/06
[52] U.S. Cl. .................... 123/433; 123/315; 123/308; 123/568; 60/304
[58] Field of Search ........... 123/433, 315, 568, 65 PE; 60/304, 305, 306, 307, 308, 291, 317

[56] References Cited

U.S. PATENT DOCUMENTS

| | | | |
|---|---|---|---|
| 4,098,237 | 7/1978 | Suquet | 123/315 |
| 4,108,119 | 8/1978 | McWhorter | 123/315 |
| 4,248,119 | 2/1981 | McWhorter | 123/568 |

FOREIGN PATENT DOCUMENTS

| | | | |
|---|---|---|---|
| 52-70222 | 6/1977 | Japan | 123/308 |
| 52-70223 | 6/1977 | Japan | 123/308 |

*Primary Examiner*—Wendell E. Burns

[57] ABSTRACT

The invention relates to exhaust and induction manifolds used in internal combustion engines and in particular to those types of engines employing cylinder ventillating facilities at each end of the piston stroke. The upper-stroke process flows, comprising the initial induction and final exhaust pumping events, are controlled in the conventional manner using poppet valves located within the cylinder clearance volume while the lower piston stoke process flows, which define the engine bottom-cycle pumping events, are controlled by bidirectional flow ejector design at side-ports positioned along the slidable working surface of the engine cylinder. The integrated flow pattern between the upper-stroke and lower-stroke process controls overlap at certain portions of the engine operation providing vertical ventilation of the engine cylinder at each bottom-stroke piston position for each discrete engine process.

12 Claims, 7 Drawing Figures

ENGINE VERTICAL VENTILLATION

CROSS REFERENCE

This invention is a continuation in part to my copending application Ser. No. 956,666 filed on Nov. 1, 1978, now abandoned in which the government of the United States of America has rights pursuant to Department of Energy Contract No. EM-78 -G-03-1979 Grant No. CA 517. and also Ser. No. 06/102,910 filed on Dec. 12, 1979 now U.S. Pat. No. 4,248,199 granted Feb. 3, 1981.

BACKGROUND OF THE INVENTION

1. Field of the Invention

The invention relates to new and useful improvements in the field of induction and exhaust manifolds used in internal combustion reciprocating piston engines and in particular to those types of engines which employ cylinder side-ports.

The invention presents new and useful applications of the ejector principle in the ventilation of reciprocating piston driven engines and in particular to those types of engines employing bottom-cycle manifolding used to conduct combustion gases from side-ports in the engine cylinder during the exhaust cycle and to provide a method of inducting fresh air into the engine cylinder through the same side-port and supplementary ports on the subsequent induction cycle.

2. Description of Prior Art

The principle of the ejector was first conceived in the early part of this century in Europe by LeBanc and in England by Parsons who are credited with the initial development. Applications of these principles were not introduced into the United States until 1915 when Harold M. Graham working in conjunction with the United States Government provided significant improvements in design and efficiency over the previous English and European designs. The invention presented is an application of these principles to the combustion gas exhaust and air induction streams of the internal combustion engine.

In the invention presented a high velocity exhaust fluid stream impinges upon an intervening low velocity air effluent stream within a common receiver resulting in the transfer of energy from the high velocity exhaust stream to the low velocity air stream. Impact between the particles comprising the gaseous media of each stream causes a resultant vector change in the momenta of the sum total of reacting particles in a manner which directs the flow of each stream along a common path and thus induces a directed flow toward ducting provided for this purpose. On the subsequent induction stroke air from the common receiver is inducted into the engine cylinder for cooling the piston crown and other engine components and also supplies additional air to support combustion. Unlike previous designs of earlier inventions valves are not required at the side-port to separate the flow of exhaust gases and air during their respected exhaust and induction cycles.

Ejectors, aspirators and syphons belong to a family of flow inducting mechanism which operate on the principle of momentum exchange based on Newtons second law. However, the flow in the latter two types of mechanism is based on liquid fluids while ejectors are in most instances designed to accommodate the flow of gaseous fluids. The earliest development of liquid momentum exchange devices is credited to James Thompson about 1852 and by Rankine in 1870. Because of the disproportionate difference in the mass of liquids compared to gases the internal flow paths of liquid momentum exchange devices are most likely to be parallel so as to take advantage of the highest flow inertia. Also because liquids are viscous and have higher surface tensions the entrainment process is, therefore, more effective at the common boundary when the flow is parallel. However, in the invention presented the reacting streams are gaseous and the efficiency of the induction of air into the engine cylinder is seen to be highest when the air flow is also parallel or nearly parallel but moving in a counter current direction to that of the exhaust streams.

The invention presented is based on the classical design features of the ejector which is defined as a nozzle or jet whose flow is directed into a diffuser. In this respect a nozzle is defined as "any channel designed to increase fluid velocity and reduce pressure", while a diffuser is defined as, "any channel designed to reduce velocity and increase pressure". In this regard a freely expanding jet may be viewed as a nozzle. The earliest attempts of attaining bidirectional flow through side-ports in the engine cylinder were by Groth in 1937, U.S. Pat. No. 2,123,302. However, this system did not employ an ejector as defined above and the flow of the exhaust and air streams were parallel and in the same direction, characteristic of momentum exchange devices which employ liquid fluids as previously described. Pumping efficiency without the use of a nozzle and diffuser section, comprising an ejector, as previously described, is very low and the 180° turning angle losses required for return air flow to the side-port in the parallel flowing system are too high for effective operation. In the present invention these deficiencies are corrected by the use of an ejector for efficient pumping action, and the air flow to the common receiver is in a nearly countercurrent direction which greatly reduces turning losses.

Other types of apparatus used principally in secondary combustion applications employ the use of venturis which operate on the Bernoulli principle which is quite different than the momentum transfer devices previously described. The first use of venturis in combustion gas streams was in the secondary combustion of blast furnace exhaust gas streams prior to 1955. These principles were then applied to the internal combustion engine by Hraboweckyj in 1969, U.S. Pat. No. 3,468,124. However, in this instance flow was unidirectional flowing only in the exhaust direction. Venturis are not ideally suited for bidirectional non-steady flow as encountered in the exhaust circuits of engine systems which operate on the Otto or Diesel thermodynamic cycles. Therefore, venturi applications should not be confused with the present invention which is designed to operate as an ejector.

Originally ejector designs were based on unidirectional steady-flow conditions. In the present invention the flow through the nozzle portion of the ejector is bidirectional and the resulting alternating flow is of varying pressure magnitude. Under these conditions the reduction of stream frictional losses and time dependent inertial turning conditions are of utmost importance in the design in order that the system function effectively in a practical sense. Therefore, the direction of flow in the air circuit is directed toward the side-port which greatly reduces these losses.

Exhaust gas flow from the engine side-port or nozzle occurs at critical or near critical pressure conditions while return air flow to the engine through the same side-port is accomplished under less vigorous ideal pressure conditions. In order to induct more air into the engine cylinder under the lower pressure conditions additional air induction holes are added horizontally to the engine cylinder at a position slightly below the exhaust nozzle.

The invention operates in the following manner. During the expansion stroke the piston uncovers the top exhaust side-port in the cylinder and gases flowing from the side-port flow into a nozzle or jet whose flow is directed toward a diffuser. The momentum exchange of the high velocity gases jetting from the side-port is used to entrain air from a surrounding common air receiver. Fresh air is pulled into the area as a result of the ejector action and the flow of this air is contiguous to the side-ports such that on the subsequent induction it is taken into the cylinder. It should be noted also, that some air is also taken in at the end of the exhaust blowdown process as a result of inertial flow which causes the cylinder pressure to drop below the air receiver pressure. In the operation of two-stroke engines the air contiguous to the cylinder side-ports is pressurized simultaneously by the inertial flow in the air duct and the returning compression wave in the exhaust duct during the momentary closure of the side-port by a protrusion on the piston face. However, when the exhaust duct is not tuned an external pressurizing source is required.

There are many energy saving advantages in the application of this type of manifold in the design of internal combustion engines. The advantages are seen to be in the lower thermal loads on the upper cylinder components as a result of the early exit of hot gases, and in the additional breathing capacity which increases the system volumetric efficiency. As a result of the early evacuation of exhaust gases the exhaust pumping losses are also reduced which is another feature of the design.

Therefore a novel feature of the invention is its ability to selectively separate the flow of air and combustion gases from a common air receiver volume for entry and exit from the engine cylinder without the use of valves. Another novel feature of the invention is the application of ejector design principles to non-steady state flow conditions with reversing bidirectional flow at the jet leading to and from the engine cylinder. These features coupled with the combination of jet and diffuser configurations and their sequential operation with the upper cylinder manifolding constitute the major design considerations of the invention but are not limited entirely to these.

SUMMARY OF THE INVENTION

The invention is a manifold for use on internal combustion engines. The manifold is designed for bidirectional flow to and from a common receiver using an ejector for exhausting combustion gas from an engine cylinder side-port when the piston is at or near the bottom of its stroke at the end of the expansion cycle and also for the induction of air through the same side-ports at the end of the exhaust blowdown and in particular on the subsequent induction stroke of those types of engines which operate on the 4-stroke principle.

The object of the invention is to supplement the operation of induction and exhaust valves operating in the cylinder clearance and thereby reduce the thermal load on the upper cylinder components.

Another object of the invention is to eliminate the requirement of crankcase storage and compression of charging air in the operation of 2-stroke engines. When operating in this manner lubricating oil need not be added to the fuel supply since the cylinder walls and crankcase can be lubricated in the same manner as 4-stroke engines.

And yet another object of the invention is to decrease the piston pumping work necessary to expel combustion gases through the upper cylinder exhaust valve.

And still another object of the invention is to increase the volume of air inducted into the engine cylinder and to lower the temperature of residual gases in the cylinder and thus increase the engine volumetric efficiency.

Further objects and advantages of the engine will become apparent from a study of the drawings and specification presented.

BRIEF DESCRIPTION OF THE DRAWINGS

Drawings have been prepared which show in detail the elements of the bottom-cycle manifolding comprising the lower components of the engine vertical ventilation system.

DESCRIPTION OF PREFERRED EMBODIMENT

Figure 1:
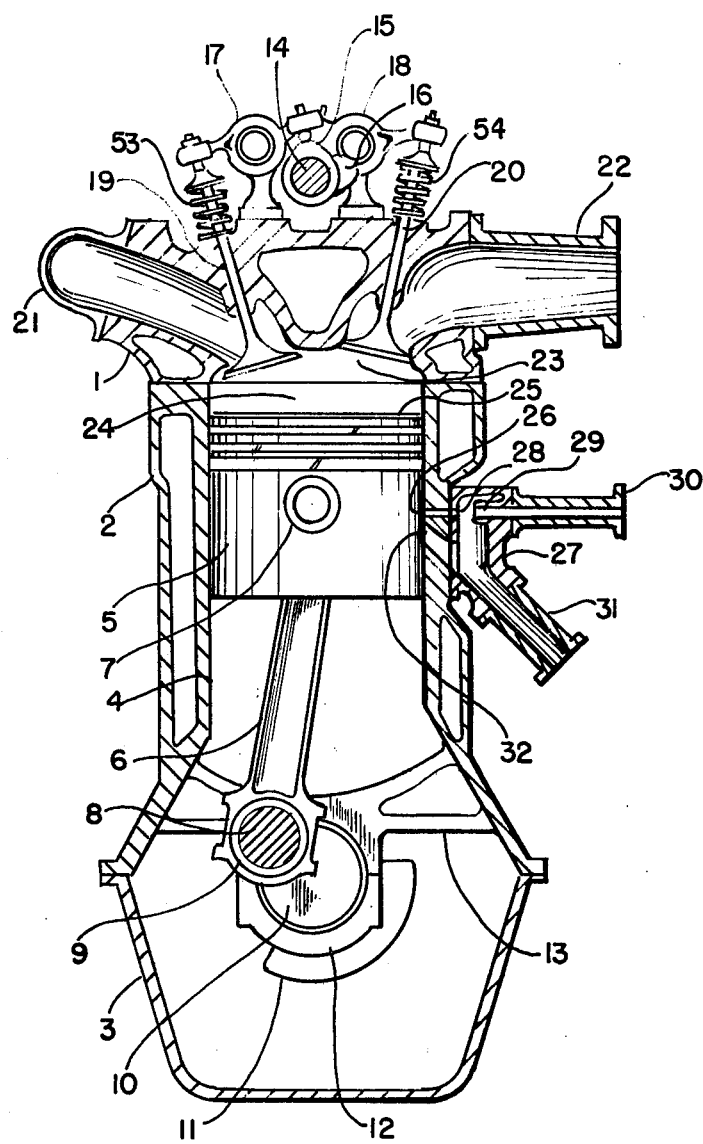
FIG. 1 is a drawing of an engine shown principally in cross-section showing the various elements comprising the lower ejector manifolding and their relative location and relationship to the upper cylinder components as they relate to the vertical ventillation of the engine.

Referring now to the drawings in detail and to FIG. 1 thereof in particular which is a section of an engine assembly comprising an engine head 1, cylinder block 2, and crankcase 3 of an engine having a plurality of cylinders 4. Piston 5 is slidably mounted in cylinder 4. Connecting rod 6 is pivotally mounted in piston 5 at the upper end by gudgeon pin 7 and rotatively mounted on crankpin 8 over sleeve bearing 9 at the other end. The rotation of crankshaft 10 with counter weight 11 within the main journals 12 which are fixedly attached to cylinder block 2 by supporting arms 13 will cause piston 5 to rise and fall within cylinder 4 in a reciprocating motion which is common to all piston driven engines.

Camshaft 14 is rotatively mounted in engine head 1 and is driven by crankshaft 10 in the conventional manner by a gear train or by a chain or gear belt operating on gear sprockets. For the purpose of pictorial clarity the method of driving camshaft 14 is not shown. The connection between crankshaft 10 and camshaft 14 is such that one complete revolution of crankshaft 10 caused only one-half of a revolution of camshaft 14 which is typical of all engine systems which operate on the 4-stroke principle. When the engine system shown in FIG. 1 is operated on the 2 stroke principle the camshaft 14 is rotated once for each complete rotation of crankshaft 10.

Cams 15 and 16 bearing on rocker arms 17 and 18 respectively are presented as a means of opening and closing air inlet valve 19 and exhaust valve 20 which control the air flow in main air inlet duct 21 and combustion gas flow in main exhaust duct 22 respectively. Springs 53 and 54 are used as a means of returning air inlet valve 19 and exhaust valve 20 to the normally closed position when not being acted upon by cams 15 and 16 respectively. Air flowing in main air inlet duct 21 may be intermixed with a quantity of fuel from conventional carburetion or injection devices or it may be considered to consist entirely of the quality of the inducted air. In the latter condition fuel may then be considered as entering the clearance volume 23 above piston 5 by the conventional injection methods typical of diesel engine operation.

During the engine power stroke combustion gases fill the clearance volume 23 and also the swept volume 24 above piston 5 which is immediately adjacent to the clearance volume 23. As piston crown 25 drops below the upper side-port 26, the swept volume 24 is brought into communication with the interior volume of air receiver 27 through an opening in the air receiver 27 which is called jet 28. However, it is easy to recognize the fact that side-port 26 and jet 28 could be integrally formed as a single feature of engine cylinder block 2. In this instance jet 28 could be a cylindrical drilled hole which forms the continuous passage way between swept volume 24 and the volume of air receiver 27. Similarly the integrally formed passage way could be counter sunk on the exit side adjacent to the air receiver forming a divergent conical section of a nozzle. The combustion gases within cylinder 4 swept volume 24 are at an absolute pressure which is approximately twice the pressure of air within air receiver 27. Therefore when the swept volume 24 is brought into communication with the volume of air receiver 27 combustion gases flow through the side-port 26 and are exhausted at high velocity from jet 28 which is directed toward the exhaust opening in air receiver 27 which comprises the forward opening of diffuser 29. Diffuser 29 may be cylindrical in shape forming the forward section of secondary exhaust duct 30 as shown in FIG. 1. Air within air receiver 27 is forced by impact with the high velocity combustion gases from jet 28 into diffuser 29 thus resulting in a pumping action. Air pumped from receiver 27 is replaced by air flowing into the receiver from secondary air duct 31.

It is most important to note that jet 28 and diffuser 29 comprise the elements of an ejector system as previously described above. Therefore, air from air receiver 27 is forced into diffuser 29 by the process of momentum exchange with high velocity combustion gases from jet 28 rather than by differential pressure methods such as found in the use of venturis or aspiration processes which function on the Bernoulli principle and on simple entrainment processes occurring near a boundry layer.

Fresh air flowing through secondary air duct 31 replaces the air pumped from air receiver 27. Therefore fresh air is always present in air receiver 27 adjacent to a lower cylinder side-port 32 which may be a single opening into cylinder 4 or a plurality of such openings.

As piston 5 continues to drop exhaust valve 20 is caused to open by camshaft 14. As the exhaust blowdown continues from side-port 26 and exhaust valve 20 the inertia flow out of cylinder 4 causes the pressure in cylinder swept volume 24 to fall below the air pressure in air receiver 27. Therefore as piston crown 24 drops below the lower cylinder side-ports 32 air from air receiver 27 flows through side-ports 32 into the cylinder swept volume 24. Induction of air in this manner when the piston is at the end of the power stroke, helps to cool the engine and also assists in purging the engine of exhaust gas residue by dilution of the combustion gases remaining in the clearance volume when piston 5 again rises during the exhaust stroke to the top-dead-center position within cylinder 4 relative to the position of crankshaft 10 rotation in preparation for the subsequent induction stroke. It should also be understood that the pressure of combustion ion gases within the swept volume 24 will vary with the engine speed and engine load which in some instance does not allow a net difference in pressure, in which case induction of air through the lower cylinder side-ports 32 is negligible at the end of the exhaust stroke under these latter conditions.

During the induction stroke, when piston 5 again begins to drop, exhaust valve 20 is closed and inlet valve 19 is open. However, because of frictional flow losses in main air inlet duct 21 and because of restrictions at the annular flow section between the inlet valve 19 and that portion of engine head 1 comprising the corresponding valve seat, the pressure within the clearance volume 23 and the swept cylinder volume 24 is lower than the ambient air adjacent to the inlet which is approximately the pressure of air within air receiver 27. Therefore as piston crown 26 drops below the upper side-port 26 and the lower side ports 32 the swept cylinder volume is again brought into communication with the internal volume of air receiver 27 and air is taken into cylinder 4 through these openings because of the differential pressures existing as previously described.

The ability to induct air through the upper and lower cylinder side-ports in the manner described in conjunction with air inducted past inlet valve 19 greatly improves the overall engine volumetric efficiency. It should also be noted that there are no external control valves used to sequentially separate the exhaust gas and air flows within their individual circuits in air receiver 27.

Figure 2:
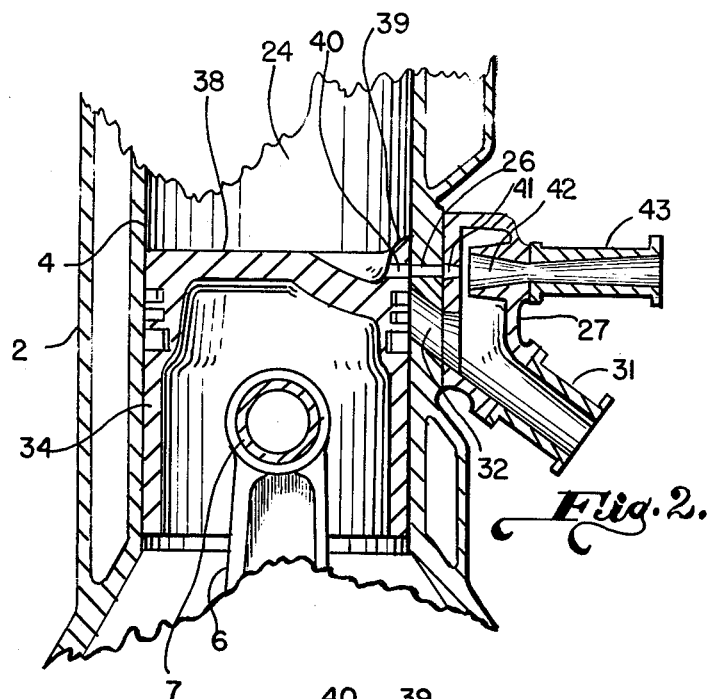
FIGS. 2 and 3 are drawings of the piston and lower cylinder and ejector manifolding shown principally in section for use in describing a different method of sequencing flow thru the engine lower manifold.
Figure 3:
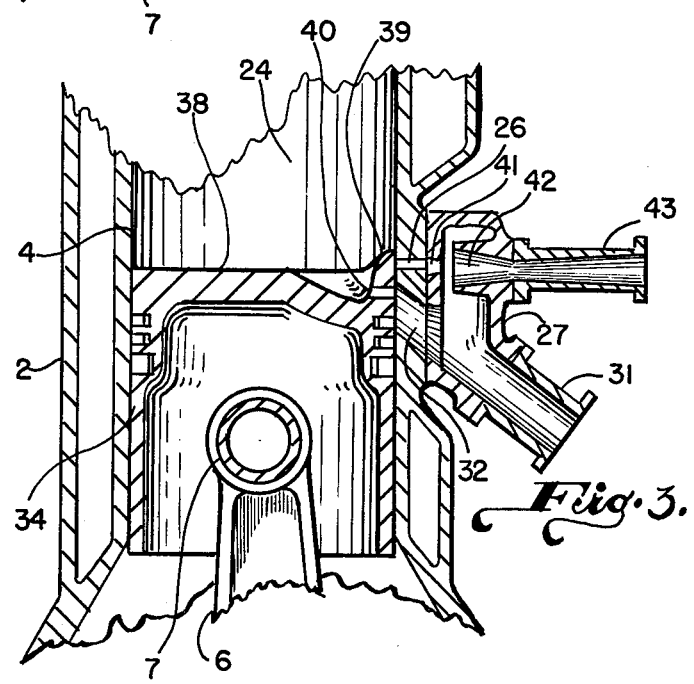

Turning now to FIGS. 2 and 3 which show a different method of staging the sequential flow of combustion gases and air through the upper and lower cylinder side-ports 26 and 32 respectively by a modification of the piston crown.

Looking first at FIG. 2. Piston 34 is slidably mounted in cylinder 4 in the same manner as shown in FIG. 1. However piston crown 38 has a lip 39 which protrudes above its surface with opening 40 in said lip. In some instances lip 39 may contain a plurality of openings such as opening 40. The swept volume 24 above piston 34 is brought into communication with the interior volume of air receiver 27 when opening 40 in lip 39 is aligned with the upper side-port 26. Therefore when piston 34 is in the position shown in FIG. 2 at the end of the power stroke combustion gases flow through opening 40 into side-port 26 and issue forth from jet 41 which is in this instance shaped as a convergent cone to show the versatility of the design. The flow from jet 41 is directed toward diffuser 42 which for the purpose of illustration is also shaped as a convergent cone while exhaust duct 43 attached to air receiver 27 is shown as a divergent cone. Again, as in the case of the system shown in FIG. 1, the combustion gases flowing from jet 41 impact air in air receiver 27 and carry it into diffuser 42 and out into exhaust duct 43 causing a pumping action within air receiver 27. This causes ambient air to flow through secondary air duct 31 into air receiver 27 to replenish the supply lost in the momentum transfer process described.

Turning now to FIG. 3 which shows the positioning of lip 39 over upper side-port 26 such that the flow through this port is now restricted. Opening 40 is now aligned within the lower side-port 32, and therefore as the pressure within cylinder 4 becomes lower than that in receiver 27 as a result of the inertial flow conditions from the exhaust blowdown occur, as previously described, air from receiver 27 enters the swept cylinder volume 24 through the lower side-port 32.

The piston modification shown in FIGS. 2 and 3 has particular application in two-stroke engine operation but is not limited in this respect to this singular type of operation.

Figures 4, 5, 6, 7:
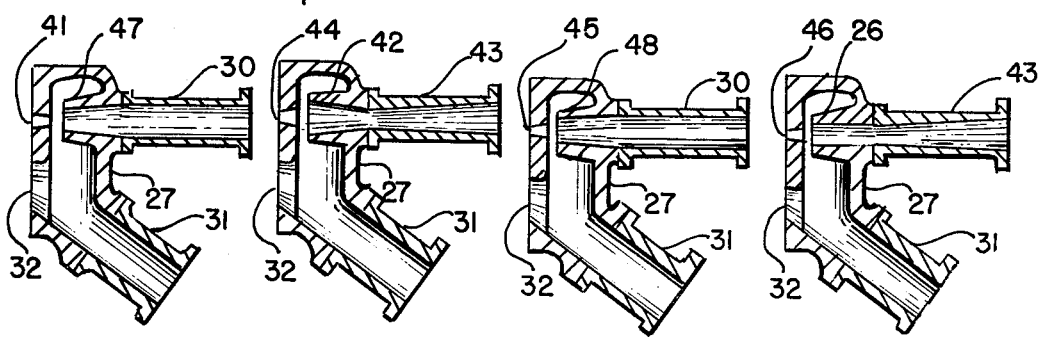
FIGS. 4 through 7 are sectional views of the ejector and air receiver illustrating various combinations of nozzle and diffuser configurations.

The geometrical configuration of the various jets and diffusers comprising the ejector and the various combinations thereof, nine in all, do not constitute a major design consideration of the invention except in their relative efficiency of performance within the process conditions of the several types of engine operation previously described. The configuration of the jet may be cylindrical in shape as in the instance of jet 28 of FIG. 1, or it may be shaped as a convergent conical nozzle section as in the instant jet 41 in FIGS. 2, 3 and 4. The ejector jet may also be shaped as a divergent conical nozzle section as in FIGS. 5, 6 and 7 identified as jets 44, 45 and 46 respectively. In a similar manner the configuration of the diffuser may be shaped as a cylindrical section or as a divergent or convergent conical section. The diffuser 29 of FIG. 1 and the diffuser 26 of FIG. 7 are both cylindrical sections leading to the secondary exhaust ducts 30 and 43 respectively. While the diffuser 42 of FIGS. 2, 3 and 5 are convergent conical nozzle sections. The diffusers 47 and 48 of FIGS. 4 and 6 respectively are divergent conical nozzle configurations. The objectives of the invention, as previously stated, are therefore not limited to any single combination of geometrical configurations of the jet and diffuser comprising the ejector system.

What is claimed is:

1. A cylinder of an internal combustion engine having a plurality of such cylinders, a piston slidably mounted in said cylinder moving translationally in an up and down reciprocating motion, an air-receiver fixedly attached to said cylinder, a side-port in said cylinder, said side-port placing said cylinder internal volume above said piston in communication with the internal volume of said air-receiver when the said piston is near the bottom of its stroke in said cylinder, a diffuser fixedly attached to said air-receiver at a point opposite and axially aligned with the axial center of said side-port, said diffuser opening into an exhaust duct, a plurality of lower side-ports positioned below said side-port, said lower side-ports placing the internal volume of said cylinder in communication with the internal volume of said air-receiver when the said piston is at the bottom of its stroke, an air duct opening into said air-receiver.

2. A cylinder of an internal combustion engine having a plurality of such cylinders, a piston slidably mounted in said cylinder moving translationally in an up and down reciprocating motion, an air-receiver fixedly attached to said cylinder, a side-port in said cylinder, a jet connecting said side-port to the internal volume of said air-receiver, said side-port and said jet placing said cylinder internal volume above said piston in communication with the internal volume of said air-receiver when said piston is near the bottom of its stroke in said cylinder, a diffuser fixedly attached to said air-receiver at a point opposite and axially aligned with the axial center of said jet, said diffuser opening into an exhaust duct, a plurality of lower side-port, said lower side-ports placing the internal volume of said cylinder in communication with the internal volume of said air-receiver when the said piston is at the bottom of its stroke, an air duct opening into said air-receiver.

3. The invention of claim 2 in which the internal surfaces of said jet and said diffuser are cylindrical in shape.

4. The invention of claim 2 in which the internal surfaces of said jet and said diffuser are shaped as convergent conical sections relative to the direction of flow.

5. The invention of claim 2 in which the internal surfaces of said jet is cylindrical and the said diffuser is a divergent conical section relative to the direction of flow.

6. The invention of claim 2 in which the internal surfaces of said jet is cylindrical and the said diffuser is a convergent conical section relative to the direction of flow.

7. The invention of claim 2 in which the internal surfaces of said jet are shaped as divergent conical section while those of the diffuser are shaped as convergent conical section relative to the direction of flow.

8. The invention of claim 2 in which the internal surfaces of the said jet are shaped as a divergent conical section relative to the direction of flow and the internal surfaces of the said diffuser are cylindrical.

9. The invention of claim 2 in which the internal surfaces of the said jet are shaped as a convergent conical section relative to the direction of flow and the internal surfaces of said diffuser are cylindrical.

10. The invention of claim 2 in which the internal surfaces of said jet are shaped as a convergent conical section while those of the diffuser are shaped as a divergent conicle section relative to the direction of flow.

11. A cylinder of an internal combustion engine having a plurality of such cylinders, a piston slidably mounted in said cylinder moving translationally in an up and down reciprocating motion, said piston comprising a lip protruding above the crown of said piston, an opening in said lip, an upper side-port in said cylinder, a lower side-port below said upper side-port, an air receiver fixedly mounted over said upper and said lower side-ports, said air-receiver comprising a jet and an inlet, said jet being centered over said upper side-port and said inlet being centered over said lower side-port, a diffuser fixedly attached to the wall opposite the said upper side-port and axially aligned with the axial center of said jet, an air duct leading into said air chamber.

12. The invention of claim 11 in which the said lip contains a plurality of openings and the said cylinder contains a plurality of lower side-ports said openings and said lower side-ports coinciding in alignment when the said piston is at the bottom of its stroke in said cylinder.

* * * * *